US012501287B2

(12) United States Patent
Fontanetta et al.

(10) Patent No.: US 12,501,287 B2
(45) Date of Patent: Dec. 16, 2025

(54) AUTONOMOUS ONSITE REMEDIATION OF ADVERSE CONDITIONS FOR NETWORK INFRASTRUCTURE IN A FIFTH GENERATION (5G) NETWORK OR OTHER NEXT GENERATION WIRELESS COMMUNICATION SYSTEM

(71) Applicant: AT&T Intellectual Property I, L.P., Atlanta, GA (US)

(72) Inventors: Amee Fontanetta, Brick, NJ (US); Mohammad Nikain, Atlanta, GA (US); Vahid Tavassoli, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 626 days.

(21) Appl. No.: 17/491,360

(22) Filed: Sep. 30, 2021

(65) Prior Publication Data
US 2023/0100203 A1   Mar. 30, 2023

(51) Int. Cl.
*H04W 24/04*   (2009.01)
*B33Y 50/00*   (2015.01)
*G06V 20/10*   (2022.01)
*H04L 41/149*   (2022.01)
*H04W 84/04*   (2009.01)

(52) U.S. Cl.
CPC ............. *H04W 24/04* (2013.01); *B33Y 50/00* (2014.12); *G06V 20/176* (2022.01); *H04L 41/149* (2022.05); *H04W 84/042* (2013.01)

(58) Field of Classification Search
CPC .... H04W 24/04; H04W 84/042; B33Y 50/00; G06V 20/176; H04L 41/149; H04L 41/0654
See application file for complete search history.

(56) References Cited

U.S. PATENT DOCUMENTS

| | | | | |
|---|---|---|---|---|
| 10,997,015 | B2* | 5/2021 | Singh | G06N 20/00 |
| 2020/0190963 | A1* | 6/2020 | Gooneratne | E21B 17/02 |
| 2022/0345668 | A1* | 10/2022 | Cunningham | G06F 18/41 |
| 2022/0388246 | A1* | 12/2022 | Decrop | B29C 64/386 |
| 2024/0341899 | A1* | 10/2024 | Hill | G06V 10/143 |

\* cited by examiner

*Primary Examiner* — Thomas C Lee
*Assistant Examiner* — Tyler Dean Hedrick
(74) *Attorney, Agent, or Firm* — Guntin & Gust, PLC; Kenneth S. Kwan

(57) ABSTRACT

The technologies described herein are generally directed to the autonomous onsite remediation of adverse conditions for network infrastructure in a fifth generation (5G) network or other next generation networks. For example, a method described herein can include detecting a condition of a component of network equipment at a site that has a likelihood of indicating a defined adverse event that has at least a threshold likelihood of occurring. The method can further include, in response to detecting the condition, facilitating generating a graphical image of the component. Further, the method can include, based on information determined from the graphical image, remediating the condition.

20 Claims, 10 Drawing Sheets

700

702

DETECT A CONDITION OF A COMPONENT OF SECOND NETWORK EQUIPMENT AT A SITE THAT HAS A LIKELIHOOD OF INDICATING A DEFINED ADVERSE EVENT THAT HAS AT LEAST A THRESHOLD LIKELIHOOD OF OCCURRING

CONDITION DETECTING COMPONENT 122

704

IN RESPONSE TO DETECTING THE CONDITION, FACILITATE GENERATING A GRAPHICAL IMAGE OF THE COMPONENT

IMAGING COMPONENT 124

706

BASED ON INFORMATION DETERMINED FROM THE GRAPHICAL IMAGE, REMEDIATE, BY THE FIRST NETWORK EQUIPMENT, THE CONDITION

REMEDIATION COMPONENT 126

FIG. 7

AUTONOMOUS ONSITE REMEDIATION OF ADVERSE CONDITIONS FOR NETWORK INFRASTRUCTURE IN A FIFTH GENERATION (5G) NETWORK OR OTHER NEXT GENERATION WIRELESS COMMUNICATION SYSTEM

TECHNICAL FIELD

The subject application is related to different approaches to handling the implementation and maintenance of networked infrastructure equipment and, for example, to providing autonomously remediating adverse conditions for such equipment.

BACKGROUND

As network implementations have continued to increase in size and diversity, maintaining infrastructure equipment has continued to grow in complexity. In some contemporary implementations, private networks, and networks with large antenna arrays, can have many more devices to maintain than older implementations.

Problems can occur when network maintenance activities continue to be performed by resources that have to be moved to a site in order to perform maintenance activities.

BRIEF DESCRIPTION OF THE DRAWINGS

The technology described herein is illustrated by way of example and not limited in the accompanying figures in which like reference numerals indicate similar elements and in which:

FIG. 7 depicts a system that can facilitate the autonomous onsite remediation of adverse conditions for network infrastructure, in accordance with one or more embodiments.

DETAILED DESCRIPTION

Figure 1:
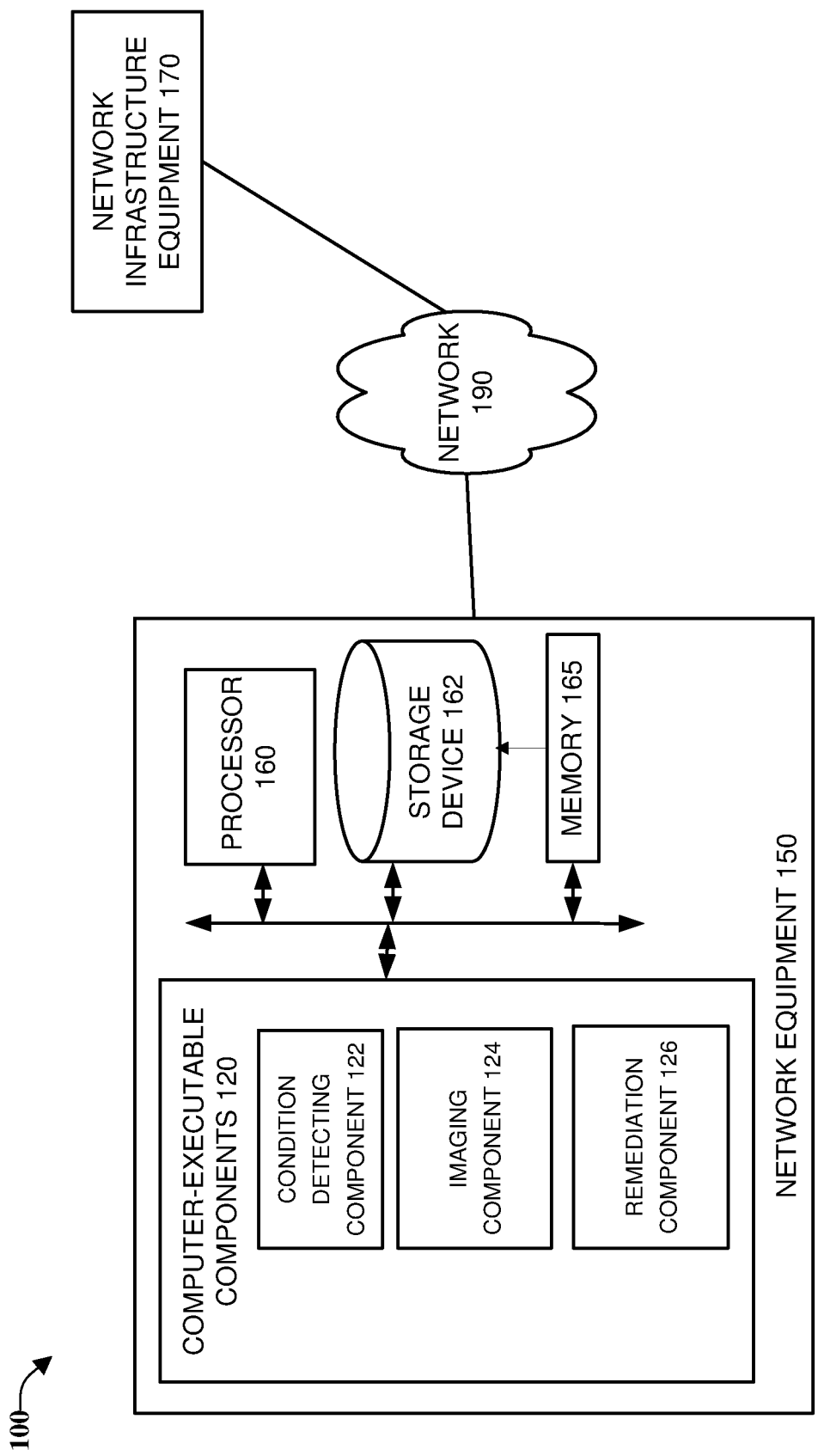
FIG. 1 is an architecture diagram of an example system that can facilitate the autonomous onsite remediation of adverse conditions for network infrastructure, in accordance with one or more embodiments.

Generally speaking, one or more embodiments can facilitate the autonomous onsite remediation of adverse conditions for network infrastructure equipment. In addition, one or more embodiments described herein can be directed towards a multi-connectivity framework that supports the operation of new radio (NR, sometimes referred to as 5G). As will be understood, one or more embodiments can allow an integration of user devices with network assistance, by supporting control and mobility functionality on cellular links (e.g., long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting terms "signal propagation equipment" or simply "propagation equipment," "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE.

The computer processing systems, computer-implemented methods, apparatus and/or computer program products described herein employ hardware and/or software to solve problems that are highly technical in nature (e.g., detecting and remediating complex adverse conditions for infrastructure equipment), that are not abstract and cannot be performed as a set of mental acts by a human. For example, a human, or even a plurality of humans, cannot efficiently formulate complex remediation plans (which generally cannot be performed manually by a human) and implement such plans, with the same level of accuracy and/or efficiency as the various embodiments described herein.

Aspects of the subject disclosure will now be described more fully hereinafter with reference to the accompanying drawings in which example components and selected operations are shown. In the following description, for purposes of explanation, numerous specific details are set forth in order to provide a thorough understanding of the various embodiments. For example, some embodiments described can facilitate the autonomous onsite remediation of adverse conditions for network infrastructure. Different examples that describe these aspects are included with the description of FIGS. 1-10 below. It should be noted that the subject disclosure may be embodied in many different forms and should not be construed as limited to this example or other examples set forth herein.

FIG. 1 is an architecture diagram of an example system 100 that can facilitate the autonomous onsite remediation of adverse conditions for network infrastructure, in accordance with one or more embodiments. For purposes of brevity, description of like elements and/or processes employed in other embodiments is omitted. It should be noted that, although many examples herein discuss particular instances of communication network infrastructure equipment (e.g., access point equipment, network core equipment), one having skill in the relevant art(s), given the description herein would appreciate that the approaches can also apply to remediation of various other types of remotely administered equipment.

As depicted, system 100 can include network equipment 150 communicatively coupled to network infrastructure equipment 170 via network 190. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, network equipment 150 can further comprise various computer and/or computing-based elements described herein with reference to mobile handset 900 of FIG. 9, and operating environment 1000 of FIG. 10. For example, one or more of the different functions of network equipment can be divided among various equipment, including, but not limited to, including equipment at a central node global control located on the core Network, e.g., mobile edge computing (MEC), self-organized networks (SON), or RAN intelligent controller (MC) network equipment.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining condition detecting component 122. As discussed further below, condition detecting component 122 can, in accordance with one or more embodiments, detect a condition of a component of second network equipment at a site that has a likelihood of indicating a defined adverse event that has at least a threshold likelihood of occurring. For example, in one or more embodiments, detect a condition of a component of network infrastructure equipment 170 at a site that has a likelihood of indicating a defined adverse event that has at least a threshold likelihood of occurring.

Further, in another example, in one or more embodiments, computer executable components 120 can include instructions that, when executed by processor 160, can facilitate performance of operations defining imaging component 124. As discussed with FIGS. 3 and 5 below, imaging component 124 can, in accordance with one or more embodiments, in response to detecting the condition, facilitate generating a graphical image of the component. For example, in one or more embodiments can in response to detecting the condition, facilitate generating a graphical image of the component.

In yet another example, computer executable components 120 can include instructions that, when executed by processor 160, can facilitate performance of operations defining remediation component 126. As discussed herein, remediation component 126 can, based on information determined from the graphical image, remediate the condition. For example, in one or more embodiments, based on information determined from the graphical image, remediate, by the first network equipment, the condition.

Figure 2:
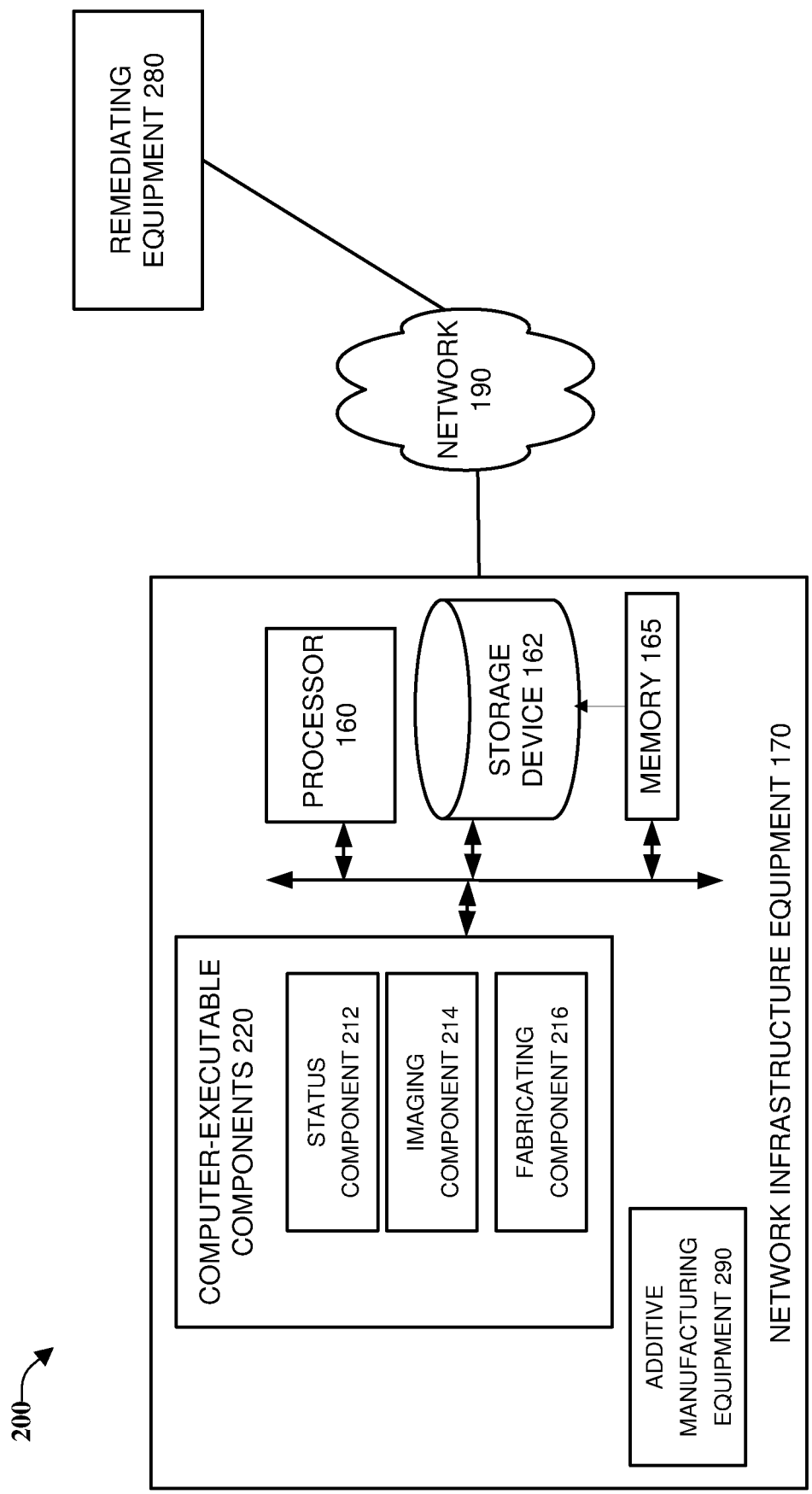
FIG. 2 is a diagram of a non-limiting example system that can facilitate the autonomous onsite remediation of adverse conditions for network infrastructure, in accordance with one or more embodiments.

FIG. 2 is a diagram of a non-limiting example system 200 that can facilitate the autonomous onsite remediation of adverse conditions for network infrastructure, in accordance with one or more embodiments. For purposes of brevity, description of like elements and/or processes employed in other embodiments is omitted. As depicted, system 200 can include network infrastructure equipment 170 communicatively coupled to remediating equipment 280 via network 190. In one or more embodiments, network infrastructure equipment 170 can include memory 165, storage device 162, processor 160, computer-executable components 220, additive manufacturing equipment 290, as well as other components described or suggested herein that facilitate the operation of system 200.

In one or more embodiments, memory 165 can store one or more computer and/or machine readable, writable, and/or executable components and/or instructions 220 that, when respectively executed by processor 160, can facilitate performance of operations defined by the executable component(s) and/or instruction(s). Generally, applications (e.g., computer executable components 220) can include routines, programs, components, data structures, etc., that perform particular tasks or implement particular abstract data types. In system 200, computer executable components 220 can include status component 212, imaging component 214, and other components described or suggested by different embodiments described herein that can improve the operation of system 200.

For example, in one or more embodiments, computer executable components 220 can be used in connection with implementing one or more of the systems, devices, components, and/or computer-implemented operations shown and described in connection with FIG. 2 or other figures disclosed herein. For example, in one or more embodiments, computer executable components 220 can include instructions that, when executed by processor 160, can facilitate performance of operations defining status component 212. As discussed with FIGS. 4-5 below, in one or more embodiments, status component 212 can send information corresponding to a fault status of a component of the network equipment to remediation equipment, with this information causing the remediation equipment to capture an image of the component. For example, one or more embodiments can send information corresponding to a fault status of a component of the network equipment to remediation equipment, with this information causing the remediation equipment to capture an image of the component.

In another example, in one or more embodiments, computer executable components 220 can include instructions that, when executed by processor 160, can facilitate performance of operations defining, imaging component 214. As discussed with FIGS. 3 and 5 below, imaging component 214 can, in accordance with one or more embodiments, capture an image of the component, e.g., to facilitate remediation of detected adverse conditions.

Figure 3:
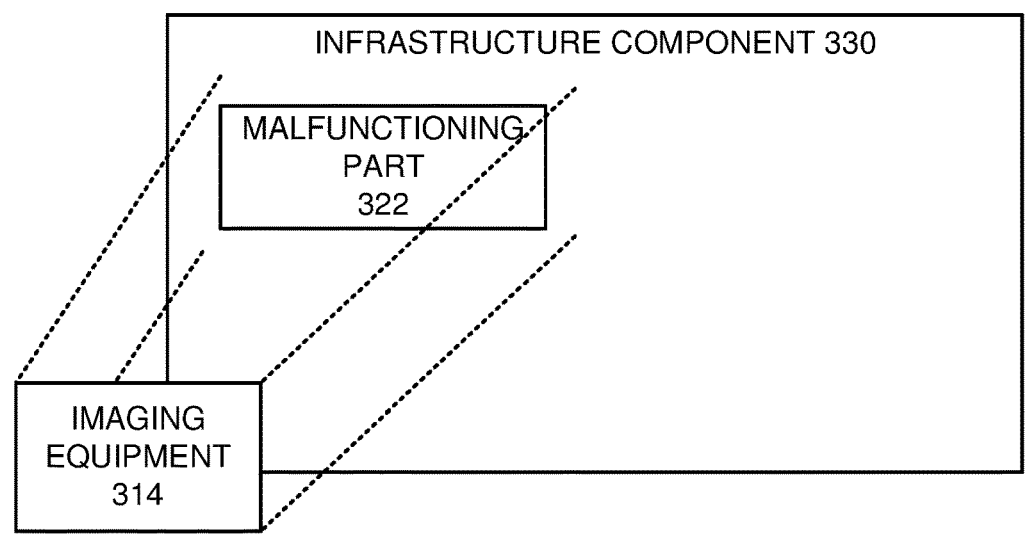
FIG. 3 is a diagram of a non-limiting example system that can facilitate the autonomous onsite remediation of adverse conditions for network infrastructure, in accordance with one or more embodiments.

FIG. 3 is a diagram of a non-limiting example system 300 that can facilitate the autonomous onsite remediation of adverse conditions for network infrastructure, in accordance with one or more embodiments. For purposes of brevity, description of like elements and/or processes employed in other embodiments is omitted. As depicted, system 130 can include imaging equipment 314 and infrastructure component 330 with malfunctioning part 322, as well as other components described or suggested herein that facilitate the operation of system 300.

As noted above, in one or more embodiments, imaging component 124 can, in response to detecting the adverse condition, facilitate generating a graphical image of the component, e.g., malfunctioning part 322. In one approach that can be used by one or more embodiments, imaging component 124 can facilitate directing imaging equipment 314 to generate a graphical image of malfunctioning part 322. One having skill in the relevant art(s), given the disclosure herein, appreciates that graphical images generated by one or more embodiments can be tailored for the parts images, and include, but are not limited to, images generated based on illumination by natural, infrared, and ultraviolet light.

It should further be appreciated that the image generation by embodiments can facilitate different operations performed by embodiments, including, but not limited to, generating multiple images to identify different features to detect the adverse condition, identify potential causes of the condition, formulate an approach to mitigating the adverse condition, and evaluate whether the selected approach was successful.

Figure 4:
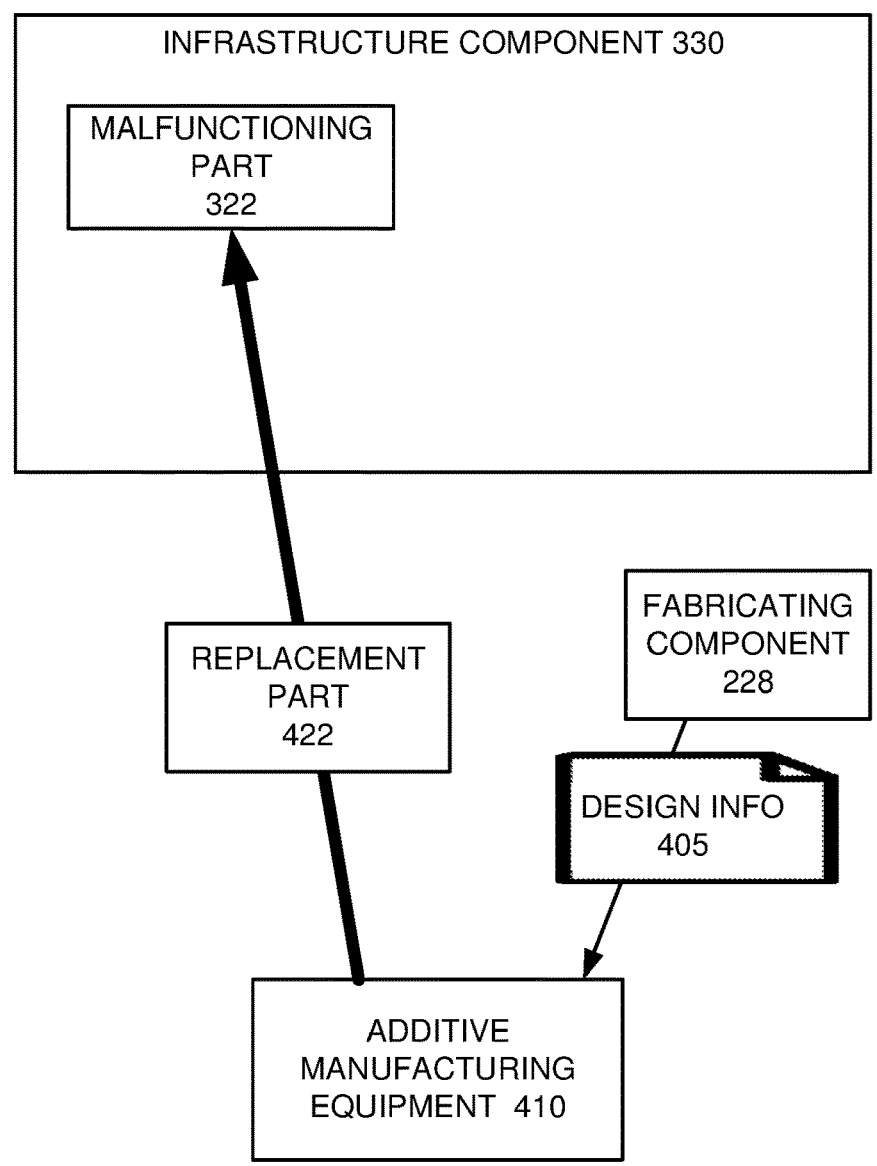
FIG. 4 depicts a flowchart of an example process that can facilitate the onsite fabrication replacement parts for autonomous onsite remediation of network components, in accordance with one or more embodiments.

FIG. 4 depicts a flowchart of an example system 400 that can facilitate the onsite fabrication replacement parts for autonomous onsite remediation of network components, in accordance with one or more embodiments. For purposes of brevity, description of like elements and/or processes employed in other embodiments is omitted. As depicted, system 400 can include infrastructure component 330, additive manufacturing equipment 410 generating replacement part 422 to replace malfunctioning part 322, fabricating component 228 relaying design info 405, as well as other components described or suggested herein that facilitate the operation of system 400.

In one or more embodiments, remediating problems with infrastructure component 330 can include analyzing the graphical image generated by imaging equipment 314 to determine features relating to mitigating the adverse condition of infrastructure component 330. As depicted in FIG. 4, based on the analyzing, additive manufacturing equipment (e.g., three-dimensional (3D) printing) can generate replacement part 422 based on design information 405 provided by fabricating component 228.

In an example embodiment, design information 405 can be stored onsite with network infrastructure equipment 170, e.g., at the time of installation of infrastructure component 330, design information 405 for different replacement parts 422 can be stored via storage device 162. Alternatively, a part or all of design information 505 can be provided from remote locations based on a detected condition or request from network infrastructure equipment 170, e.g., relayed from storage device 162 in remediating equipment 280.

In another example, one or more embodiments can identify that malfunctioning part 322 is malfunctioning because of problems with program code in onsite components. In some circumstances, such program code may not be able to be accessed remotely, and one or more embodiments can implement replacement code to remediate the adverse conditions.

Figure 5:
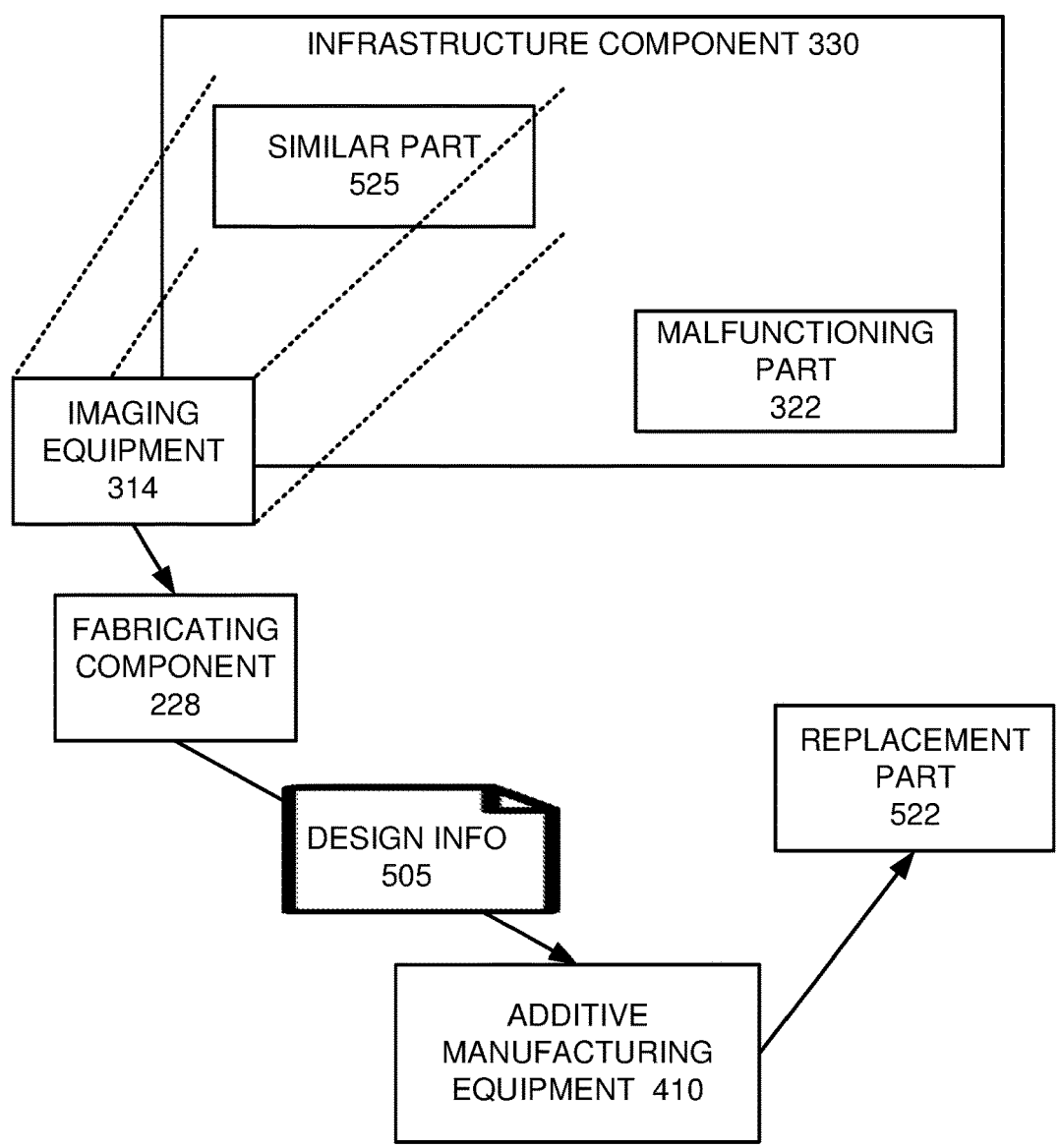
FIG. 5 depicts a flowchart of an example process that can facilitate the onsite fabrication replacement parts for autonomous onsite remediation of network components, in accordance with one or more embodiments.

FIG. 5 depicts a flowchart of an example process 500 that can facilitate the onsite fabrication replacement parts for autonomous onsite remediation of network components, in accordance with one or more embodiments. For purposes of brevity, description of like elements and/or processes employed in other embodiments is omitted. As depicted, system 500 can include infrastructure component 330 with malfunctioning part 322 and similar part 525, additive manufacturing equipment 410 generating replacement part 522 to replace malfunctioning part 322, fabricating component 228 relaying design information 505 based on information from imaging equipment 314, as well as other components described or suggested herein that facilitate the operation of system 500.

It yet another approach to providing design information 505 to additive manufacturing equipment 410, in one or more embodiments depicted in FIG. 5, after malfunctioning part 322 is identified, similar part 525 to malfunctioning part 322 can be identified, e.g., by analysis of imagery generated by imaging equipment 314. After identification, design information 505 can be provided by the approaches discussed above.

Alternatively, as depicted in FIG. 5 based on analysis of similar part 525, fabricating component 228 can generate design information 505 onsite, e.g., without design information 505 being previous stored onsite or provided by remote systems. One having skill in the relevant art(s), given the description herein, would appreciate how image analysis can be used to identify different structural elements of malfunctioning part 322, and how these identified structural elements can be used to generate design information 505.

Figure 6:
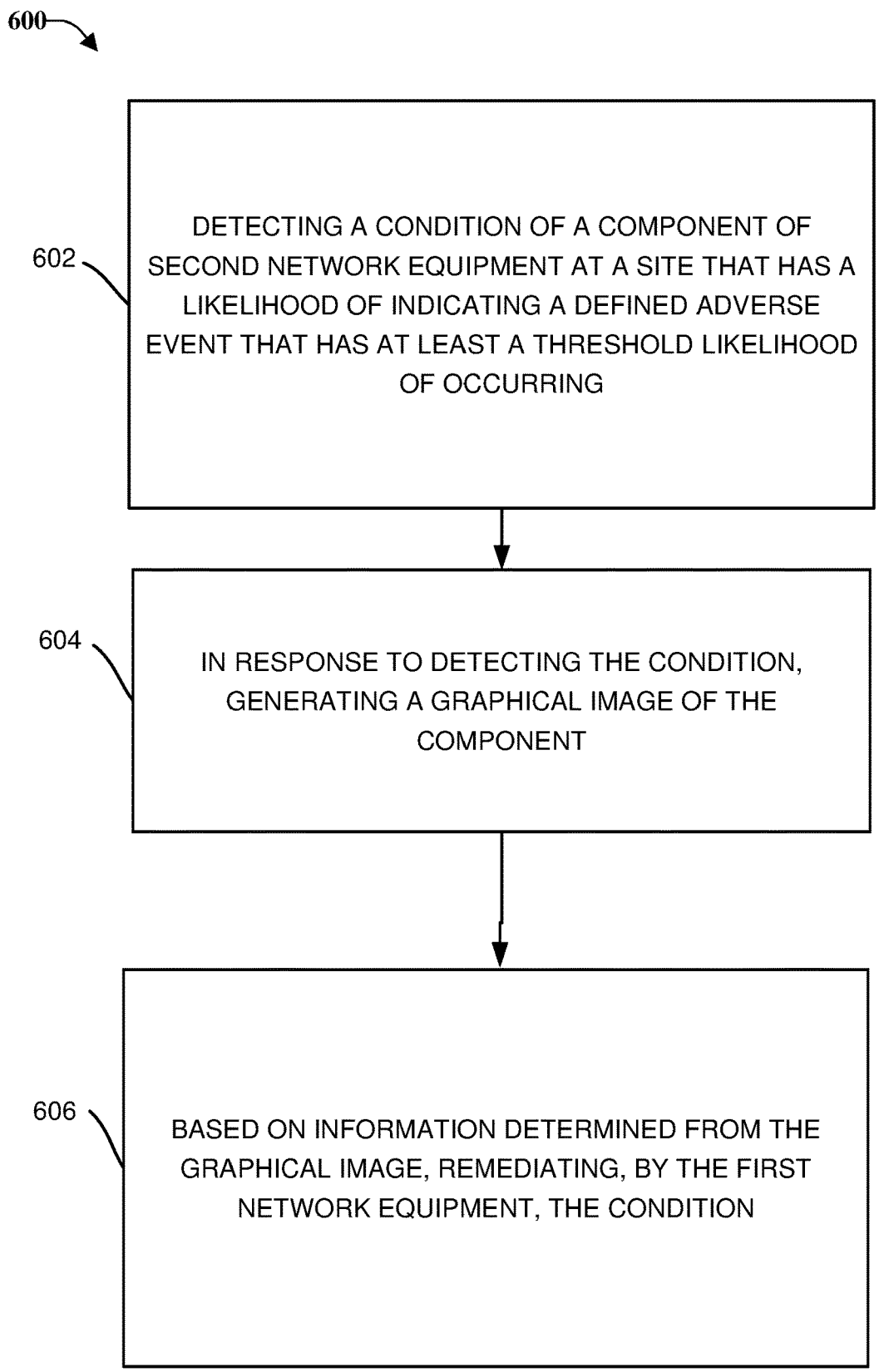
FIG. 6 illustrates an example method that can facilitate the autonomous onsite remediation of adverse conditions for network infrastructure, in accordance with one or more embodiments.

FIG. 6 illustrates an example method 600 that can facilitate the autonomous onsite remediation of adverse conditions for network infrastructure, in accordance with one or more embodiments. For purposes of brevity, description of like elements and/or processes employed in other embodiments is omitted.

At 602, method 600 can include detecting a condition of a component of second network equipment at a site that has a likelihood of indicating a defined adverse event that has at least a threshold likelihood of occurring. For example, one or more embodiments, remediating equipment 280 can detect a problem with malfunctioning part 322 of infrastructure component 330 in network infrastructure equipment 170. The detecting can include estimating that the problem has at least a threshold likelihood of occurring.

At 604, method 600 can include, in response to detecting the condition, facilitating generating a graphical image of the component. For example, in one or more embodiments, in response to detecting the condition of malfunctioning part 322 of infrastructure component 330, imaging component 214 can facilitate generating a graphical image of malfunctioning part 322, e.g., by imaging equipment 314.

At 606, method 600 can include, based on information determined from the graphical image, remediating the condition. For example, in one or more embodiments, based on information determined from the graphical image generated by imaging equipment 314, the condition can be remediated, by fabricating component 228 selecting design information 405 for replacement part 422 to be fabricated by additive manufacturing equipment 410.

FIG. 7 depicts a system 700 that can facilitate the autonomous onsite remediation of adverse conditions for network infrastructure, in accordance with one or more embodiments. For purposes of brevity, description of like elements and/or processes employed in other embodiments is omitted. As depicted, system 700 can include condition detecting component 122, imaging component 124, remediation component 126, and other components described or suggested by different embodiments described herein, that can improve the operation of system 700.

In an example, component 702 can include the functions of condition detecting component 122, supported by the other layers of system 700. For example, component 702 can detect a condition of a component of second network equipment at a site that has a likelihood of indicating a defined adverse event that has at least a threshold likelihood of occurring. For example, in one or more embodiments, detect a condition of a component of network infrastructure equipment 170 at a site that has a likelihood of indicating a defined adverse event that has at least a threshold likelihood of occurring.

In this and other examples, component 704 can include the functions of imaging component 124, supported by the other layers of system 700. Continuing this example, in one or more embodiments, component 704 can, in response to detecting the condition, facilitate generating a graphical image of the component. For example, one or more embodiments can, in response to detecting the condition, facilitate having imaging equipment 314 generate a graphical image of malfunctioning part 322.

In an example, component 706 can include the functions of remediation component 126, supported by the other layers of system 700. For example, component 706 can, based on information determined from the graphical image, remediate the condition. For example, in one or more embodiments, remediation component 126 of network equipment 150 can, based on information determined from the graphical image, remediate the condition of malfunctioning part 322 by providing design information 405 to fabricating component 228 to facilitate the fabrication of replacement part 422.

Figure 8:
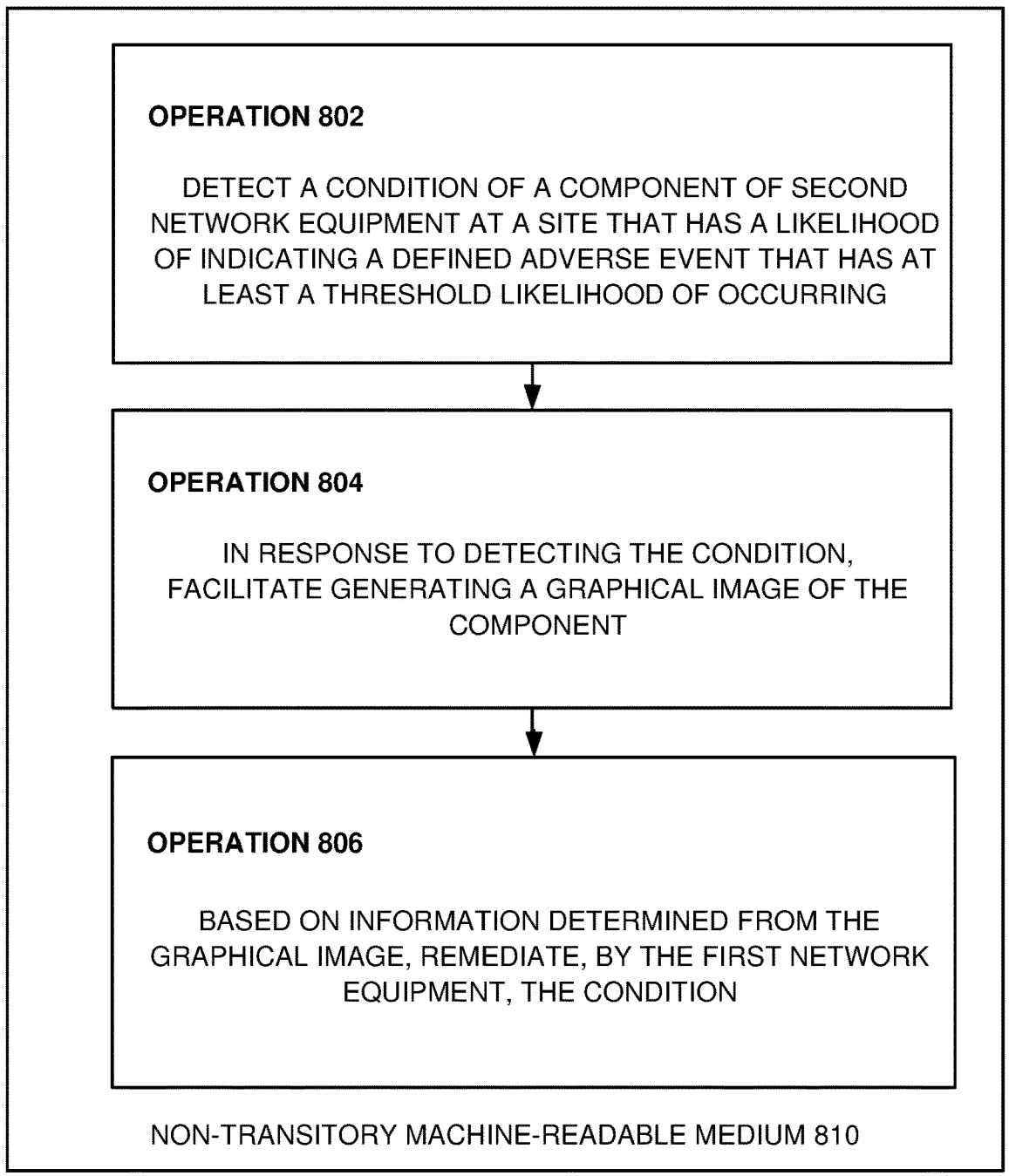
FIG. 8 depicts an example non-transitory machine-readable medium that can include executable instructions that, when executed by a processor of a computer system, facilitate the autonomous onsite remediation of adverse conditions for network infrastructure, in accordance with one or more embodiments.

FIG. 8 depicts an example 800 non-transitory machine-readable medium 810 that can include executable instructions that, when executed by a processor of a computer system, facilitate the autonomous onsite remediation of adverse conditions for network infrastructure, in accordance with one or more embodiments described herein. For purposes of brevity, description of like elements and/or processes employed in other embodiments is omitted. As depicted, non-transitory machine-readable medium 810 includes executable instructions that can facilitate performance of operations 802-808.

In one or more embodiments, the operations can include operation 802 that can detect a condition of a component of second network equipment at a site that has a likelihood of indicating a defined adverse event that has at least a threshold likelihood of occurring. For example, one or more embodiments can detect a condition of infrastructure component 330 of network infrastructure equipment 170 that has a likelihood of indicating a defined adverse event that has at least a threshold likelihood of occurring.

Operations can further include operation 804, that can, in response to detecting the condition, facilitate generating a graphical image of the component. For example, one or more embodiments can, in response to detecting the condition, facilitate generating by imaging equipment 314, a graphical image of the component.

In one or more embodiments, the operations can include operation 806 that can, based on information determined from the graphical image, remediate the condition. For example, in one or more embodiments, based on information determined from the graphical image, remediate with fabricated replacement part 422, the condition.

Figure 9:
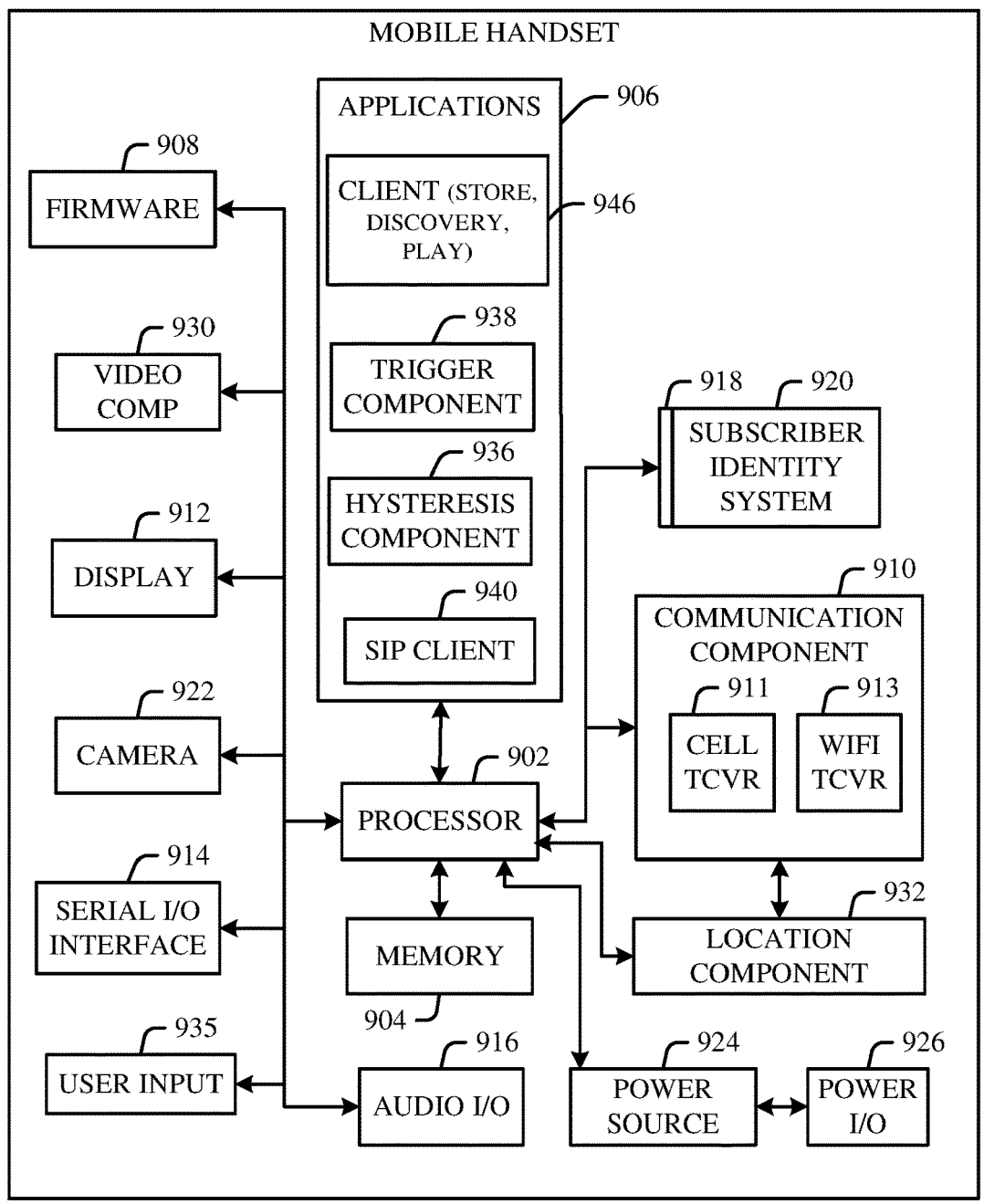
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card SIM or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
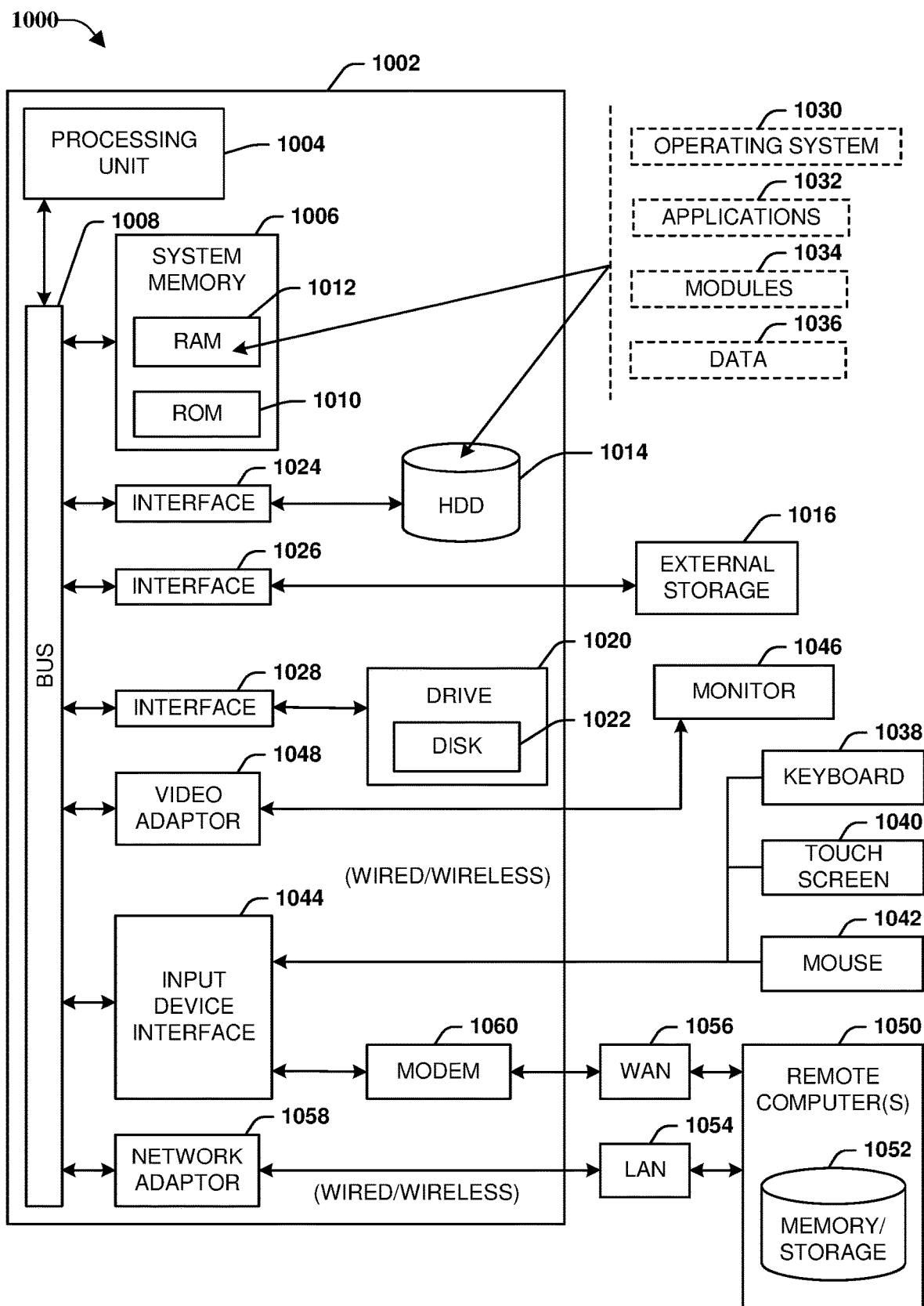
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid-state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
   detecting, by first network equipment comprising a processor, a condition of a first component of second network equipment at a site that has a likelihood of indicating a defined adverse event that has at least a threshold likelihood of occurring, wherein the detecting the condition is based on receiving information regarding a fault status of the first component of the second network equipment, wherein the detecting the condition is further based on identifying an issue relating to program code, wherein the program code affects an operation of the first component of the second network equipment, and wherein the program code is executed in one or more systems at the site and is not able to be accessed remotely from off-site;
   in response to the detecting the condition, facilitating, by the first network equipment, generating of a first image of the first component utilizing at least one of infrared light or ultraviolet light, wherein the first image is utilized to identify a potential cause of the condition; and
   based on information determined from the first image, remediating, by the first network equipment, the condition, wherein the remediating comprises causing a second image of a second component of the second network equipment to be captured, causing a replacement part to be fabricated based on the second image of the second component of the second network equipment, and causing the first component to be replaced with the replacement part, and wherein the remediating is further based on the issue relating to the program code and comprises causing replacement code to be obtained, and causing the replacement code to be implemented in the one or more systems at the site as a replacement for the program code, thereby addressing both a defect of the first component of the second network equipment and the issue relating to the program code.

2. The method of claim 1, wherein the information regarding the fault status of the first component is received from a status component.

3. The method of claim 1, wherein fabrication of the replacement part is performed at the site.

4. The method of claim 1, wherein the causing the replacement part to be fabricated comprises using additive manufacturing equipment at the site.

5. The method of claim 1, wherein remediating further comprises:
   analyzing the second image to determine a feature relating to the replacement part, and
   based on the analyzing, generating, by the first network equipment, a fabrication design for the replacement part, wherein causing the replacement part to be fabricated comprises causing the replacement part to be fabricated based on the fabrication design.

6. The method of claim 1, wherein the second component is a determined similar component to the first component.

7. The method of claim 1, wherein the second network equipment comprises access point equipment or network core equipment.

8. The method of claim 1, wherein the second network equipment comprises 5G network equipment.

9. A first equipment, comprising:
   a processor; and
   a memory that stores executable instructions that, when executed by the processor, facilitate performance of operations, comprising:
      obtaining information corresponding to a fault status of a first component of a second equipment at a site and identifying an issue relating to program code, wherein the program code affects an operation of the first component of the second equipment, and wherein the program code is executed in one or more systems at the site and is not able to be accessed remotely from off-site, wherein the information facilitates capturing of a first image of the first component, wherein the capturing involves utilizing at least one of infrared light or ultraviolet light, and wherein the first image is utilized to identify a potential cause of the fault status, and
      performing remediation of the fault status of the first component by causing a second image of a second component of the second equipment to be captured, causing a replacement part to be fabricated based on the second image of the second component of the second equipment, and causing the first component to be replaced with the replacement part, wherein the performing the remediation is further based on the issue relating to the program code and comprises causing replacement code to be obtained, and causing the replacement code to be implemented in the one or more systems at the site as a replacement for the program code, thereby addressing both a defect of the first component of the second equipment and the issue relating to the program code.

10. The first equipment of claim 9, wherein the second equipment comprises access point equipment or network core equipment.

11. The first equipment of claim 9, wherein fabrication of the replacement part is performed at the site of the second equipment.

12. The first equipment of claim 11, wherein the causing the replacement part to be fabricated comprises using additive manufacturing equipment at the site.

13. The first equipment of claim 9, wherein the remediation further comprises:
   using a result of analyzing the second image to generate a fabrication design for the replacement part, and wherein the causing the replacement part to be fabricated is based on the fabrication design.

14. The first equipment of claim 9, wherein the second component is a determined similar component to the first component.

15. The first equipment of claim 9, wherein the operations further comprise:
   generating a third image of the replacement part after replacement of the first component; and
   based on an analysis of the third image, evaluating the remediation of the fault status.

16. The first equipment of claim 9, wherein the second equipment comprises 5G network equipment.

17. A non-transitory machine-readable storage medium, comprising executable instructions that, when executed by a processor of configuration equipment, facilitate performance of operations, comprising:
   detecting a condition of a first component that is part of network equipment located at a site that indicates at least a threshold likelihood of a defined adverse event applicable to operation of the network equipment, wherein the detecting the condition is based on receiving information regarding a fault status of the first component of the network equipment, wherein the detecting the condition is further based on identifying an issue relating to program code, wherein the program code affects an operation of the first component of the network equipment, and wherein the program code is executed in one or more systems at the site and is not able to be accessed remotely from off-site;
   in response to detecting the condition, generating a first image of the first component utilizing at least one of infrared light or ultraviolet light, wherein the first image is utilized to identify a potential cause of the condition; and
   based on the first image, remediating the condition by causing a second image of a second component that is part of the network equipment to be captured, causing a replacement part to be fabricated based on the second image of the second component, and causing the first component to be replaced with the replacement part, wherein the remediating is further based on the issue relating to the program code and comprises causing replacement code to be obtained, and causing the replacement code to be implemented in the one or more systems at the site as a replacement for the program code, thereby addressing both a defect of the first component of the network equipment and the issue relating to the program code.

18. The non-transitory machine-readable storage medium of claim 17, wherein the causing the replacement part to be fabricated comprises instructing additive manufacture equipment to fabricate the replacement part.

19. The non-transitory machine-readable storage medium of claim 18, wherein the additive manufacture equipment comprises a three-dimensional printer.

20. The non-transitory machine-readable storage medium of claim 18, wherein fabrication of the replacement part is based on a fabrication design generated by the configuration equipment.

* * * * *